(12) United States Patent
Lubenski

(10) Patent No.: US 11,026,276 B2
(45) Date of Patent: *Jun. 1, 2021

(54) INTER-PGW HANDOVER ARCHITECTURE

(71) Applicant: Parallel Wireless, Inc., Nashua, NH (US)

(72) Inventor: Zeev Lubenski, North Andover, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,950

(22) Filed: Jun. 11, 2019

(65) Prior Publication Data

US 2019/0342929 A1 Nov. 7, 2019

Related U.S. Application Data

(63) Continuation of application No. 15/173,613, filed on Jun. 3, 2016, now Pat. No. 10,321,496.

(60) Provisional application No. 62/170,158, filed on Jun. 3, 2015.

(51) Int. Cl.
| | |
|---|---|
| *H04W 76/22* | (2018.01) |
| *H04W 76/12* | (2018.01) |
| *H04L 29/12* | (2006.01) |
| *H04W 76/15* | (2018.01) |
| *H04W 88/16* | (2009.01) |
| *H04W 36/00* | (2009.01) |

(52) U.S. Cl.
CPC ........... *H04W 76/12* (2018.02); *H04W 76/22* (2018.02); *H04L 61/203* (2013.01); *H04L 61/2015* (2013.01); *H04L 61/2514* (2013.01); *H04W 36/0011* (2013.01); *H04W 76/15* (2018.02); *H04W 88/16* (2013.01)

(58) Field of Classification Search
None
See application file for complete search history.

(56) References Cited

U.S. PATENT DOCUMENTS

| | | | |
|---|---|---|---|
| 8,161,132 B1* | 4/2012 | Zhao | H04L 61/2015 370/338 |
| 2009/0290540 A1* | 11/2009 | Cherian | H04L 47/10 370/328 |
| 2010/0027448 A1* | 2/2010 | Puthiyandyil | H04W 76/15 370/310 |

(Continued)

*Primary Examiner* — German Viana Di Prisco
(74) *Attorney, Agent, or Firm* — Michael Y. Saji; David W. Rouille

(57) ABSTRACT

A method is disclosed for providing IP access across packet data network gateways (PGWs), comprising: receiving, from a UE, at a coordinating node, an attach request; sending a request to create a first new session to a first PGW; sending a request to create a second new session to a second PGW; receiving, from the first PGW and at the coordinating node, a first request for policies for the UE; receiving, from the second PGW and at the coordinating node, a second request for policies for the UE; opening a first data tunnel from the coordinating node to the first PGW; opening a second data tunnel from the coordinating node to the second PGW without closing the first data tunnel; and opening a data tunnel between the UE and the coordinating node for providing IP access to both the first PGW and the second PGW.

17 Claims, 5 Drawing Sheets

UE attach with dual PGW attach

(56) References Cited

U.S. PATENT DOCUMENTS

| | | | | |
|---|---|---|---|---|
| 2013/0039343 A1* | 2/2013 | Hori | ...................... | H04W 36/12 |
| | | | | 370/331 |
| 2014/0050208 A1* | 2/2014 | Annaluru | .............. | H04W 84/12 |
| | | | | 370/338 |
| 2014/0295823 A1* | 10/2014 | Someya | ................ | H04W 24/04 |
| | | | | 455/423 |
| 2015/0172964 A1* | 6/2015 | Huang | .................. | H04W 76/30 |
| | | | | 455/437 |
| 2015/0351079 A1* | 12/2015 | Himayat | .............. | H04W 28/08 |
| | | | | 370/329 |
| 2015/0382230 A1* | 12/2015 | Miklos | .............. | H04W 28/0247 |
| | | | | 370/230 |
| 2016/0127137 A1* | 5/2016 | Fernandez Alonso | ....................... | |
| | | | | H04L 41/0893 |
| | | | | 370/259 |
| 2016/0135107 A1 | 5/2016 | Hampel et al. | | |
| 2016/0302120 A1* | 10/2016 | Draznin | ................ | H04W 36/12 |

\* cited by examiner

UE attach with dual PGW attach eNB-eNB Handover with PGW tunnel switch

INTER-PGW HANDOVER ARCHITECTURE

CROSS-REFERENCE TO RELATED APPLICATIONS

This application is a continuation of, and claims the benefit of an earlier filing date under 35 U.S.C. § 120 based on, U.S. patent application Ser. No. 15/173,613, filed Jun. 3, 2016 and entitled "INTER-PGW HANDOVER ARCHITECTURE", which itself claims the benefit of priority under 35 U.S.C. § 119(e) of U.S. Provisional Patent Application No. 62/170,158, entitled "Inter-PGW Handover Architecture," filed on Jun. 3, 2015, the entire contents of which are hereby incorporated by reference for all purposes. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; U.S. patent application Ser. No. 14/183,176, entitled "Methods of Incorporating an Ad Hoc Cellular Network into a Fixed Cellular Network," filed Feb. 18, 2014; U.S. patent application Ser. No. 14/024,717, entitled "Heterogeneous Self-Organizing Network for Access and Backhaul," and filed on Sep. 12, 2013; U.S. patent application Ser. No. 14/146,857, entitled "Heterogeneous Self-Organizing Network for Access and Backhaul," and filed on Jan. 3, 2014; U.S. patent application Ser. No. 14/571,250, entitled "Virtualization of the Evolved Packet Core to Create a Local EPC," filed on Dec. 15, 2014; and U.S. patent application Ser. No. 14/642,544, entitled "Federated X2 Gateway," filed on Mar. 9, 2015.

BACKGROUND

Long Term Evolution (LTE) networks provide connectivity using a base station, such as an eNodeB, and a core network containing a serving gateway (SGW) and a packet gateway (PGW). The PGW is an integral part of the network that acts as a gateway to the network operator's network and also to the public Internet. However, only a small number of PGWs is typically supported by an LTE network. For example, three PGWs may support all operations of a mobile operator of a medium-size country. In certain situations, such as in a border region between PGW coverage areas, it may be desirable to have more than a small number of PGWs, and to permit handovers between these PGWs.

The PGW is the anchor node for IP services, including IP based mobility, IP address management, and other operator services such as data traffic monitoring for the purposes of QoS control, charging, etc. While an operator may maintain multiple PGWs, these gateway functions are used to provide a particular service to the whole operator network, or at least a significant portion of it. For example, an USA-based operator may maintain separate PGWs for its New England operations and its California operations, but it would not do so for each neighborhood in the city of Boston. As such, IP mobility between PGWs is not supported. In fact, the UE cannot even keep the same IP address if it changes PGWs. In the event that the UE does move from one PGW to another, it will experience an interruption of data services. Of course, given the large-scale coverage of PGWs, this is unlikely and thus lack of mobility support across PGWs is not a major concern for operators. (Zúñiga et al., "Distributed Mobility Management: a Standards Landscape," IEEE Communications Magazine 51(3):80-87, March 2013.)

However, the fact that a central gateway node anchors a significant amount of traffic for network's users in a very large geographical area does raise other serious issues, as introduced in Section II. Two issues are particularly acute: i) the sheer amount of traffic "hitting" the PGW; and ii) the often highly sub-optimal routes which the need to anchor traffic at the PGW forces. It would appear that one way to address this problem would simply be to allow PGWs to cover much smaller areas and/or become much more service specific. However, this would necessitate support of one key feature currently not supported by the PGW: inter-PGW mobility. (Id.)

SUMMARY

In one embodiment, a method is disclosed for providing Internet Protocol (IP) access across packet data network gateways, comprising: receiving, from a user equipment (UE), at a coordinating node, an attach request; sending a request to create a first new session to a first packet data network gateway (PGW); sending a request to create a second new session to a second PGW; receiving, from the first PGW and at the coordinating node, a first request for policies for the UE; receiving, from the second PGW and at the coordinating node, a second request for policies for the UE; proxying the first and the second requests for policies to a policy server; opening a first data tunnel from the coordinating node to the first PGW; opening a second data tunnel from the coordinating node to the second PGW without closing the first data tunnel; and opening a data tunnel between the UE and the coordinating node for providing IP access to both the first PGW and the second PGW.

The method may further comprise anchoring IP mobility of the UE at the coordinating node across multiple PGWs. The method may further comprise assigning an IP address to the UE using one of: an IP address allocated from an address pool at the coordinating node; an IP address assigned by the first PGW; and an IP address assigned by the second PGW. The method may further comprise performing network address translation at the coordinating node for the UE in connection with data sent to and from the UE. The method may further comprise receiving, from the UE, a handover request to be handed over from a source base station to a target base station, the source base station in communication with the first PGW, the target base station in communication with the second PGW; sending, to the UE, a handover command; and using the existing second data tunnel to transport data from the UE to the second PGW. The method may further comprise using a prior IP address between the UE and the coordinating node upon handover from a source base station to a target base station, wherein the source base station and the target base station are associated with different PGWs. The method may further comprise enabling handover of one of a Voice over LTE (VoLTE) or 3G voice call across the first and the second PGW. The method may further comprise terminating the data tunnel from the UE at the coordinating node; and forwarding data from the UE data tunnel to one of the first and the second data tunnel. The method may further comprise forwarding data from the first data tunnel to the second data tunnel to facilitate handover of the UE from the first PGW to the second PGW. The method may further comprise proxying, at the coordinating node, a mobility management entity (MME). The method may further comprise proxying, at the coordinating node, a Diameter server to enable a single profile to be used to preserve a single IP address for the UE across multiple PGWs. In some embodiments, the coordinating node may be a Diameter proxy only for UEs under control of the coordinating node, and can download same profiles to multiple neighboring PGWs and preserve same IP address.

In another embodiment, a system is disclosed for providing Internet Protocol (IP) access across packet data network gateways, comprising: a coordinating node situated between and acting as a gateway between an eNodeB base station and a first and a second packet data network gateway (PGW), the coordinating node further comprising: a PGW proxy function for proxying messages to and from the first and the second PGW; an IP address allocation function for assigning an IP to a user equipment (UE) based on one of an address pool, an address assignment from the first PGW, and an address assignment from the second PGW; an IP address translation function for translating UE IP addresses to addresses for the first and the second PGW; and a policy control and rules function (PCRF) functionality configured to receive requests from the first and second PGW and to proxy the requests to a PCRF server.

The system may further comprise a PCRF server configured to provide policy responses to multiple policy requests for policies for a particular user equipment (UE) identifier. The UE identifier may be an International Mobile Subscriber Identity (IMSI). The system may further comprise a multi-radio access technology (multi-RAT) base station providing Iuh, S1, S2a and S2b protocol interfaces to the coordinating node. The coordinating node may further be configured to: receive an attach request from the UE; send a request to create a first new session to the first PGW; send a request to create a second new session to the second PGW; receive, from the first PGW, a first request for policies for the UE; receive, from the second PGW, a second request for policies for the UE; proxy the first and the second requests for policies to the PCRF server; open a first data tunnel from the coordinating node to the first PGW; open a second data tunnel from the coordinating node to the second PGW without closing the first data tunnel; and open a data tunnel between the UE and the coordinating node for providing IP access to both the first PGW and the second PGW.

DETAILED DESCRIPTION

Figure 1:
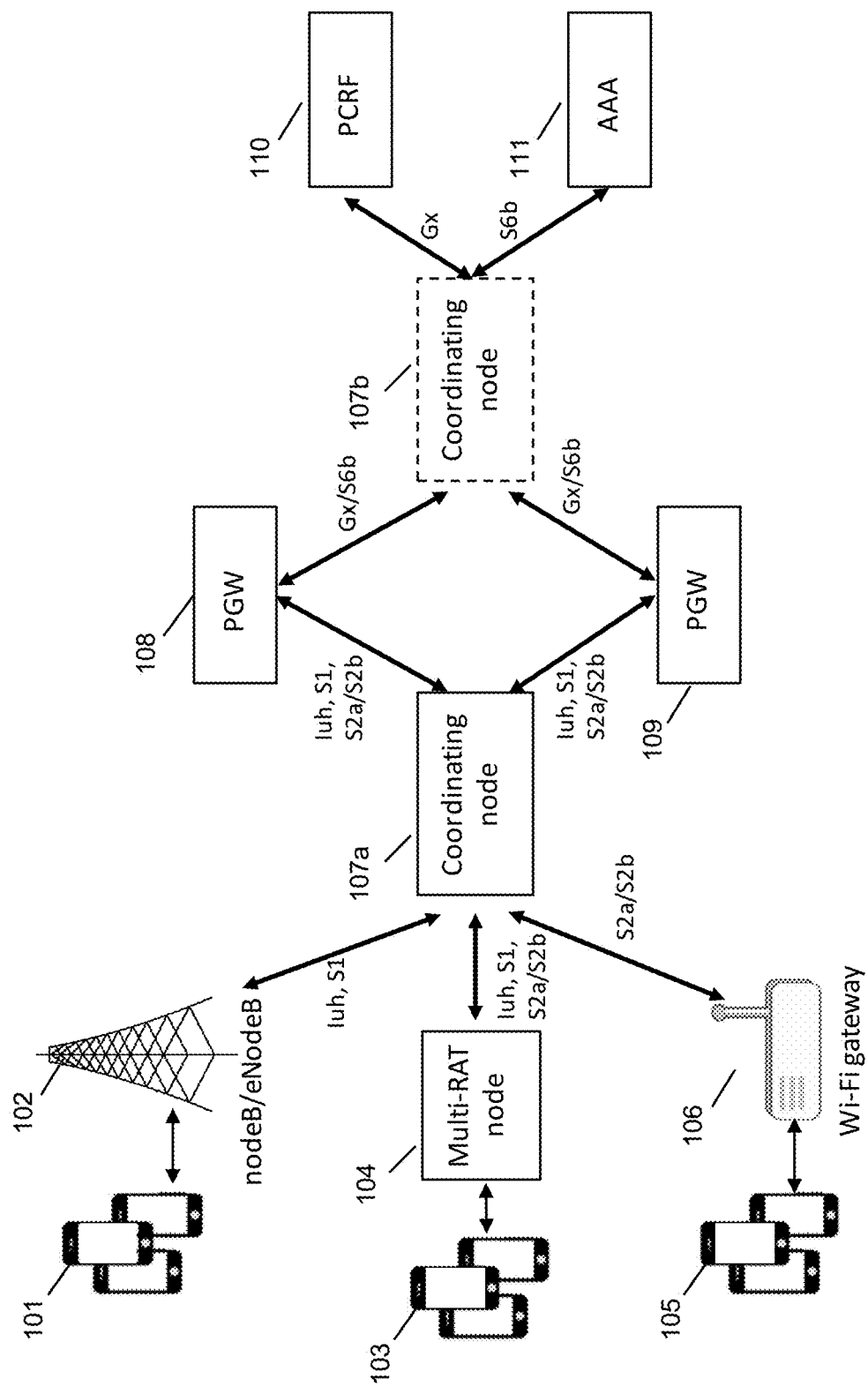
FIG. 1 is a schematic diagram of a system for providing wireless access across multiple PGWs, in accordance with some embodiments.

Currently, when a user equipment (UE) attaches to an eNodeB, the eNodeB sends a setup request to a mobility management entity (MME), which forwards this request to an SGW, which communicates via the S5 protocol to the PGW, and sets up the UE's connection. Even when S5-flex is used, only a single MME is selected, as only one MME is in the signal path. Likewise, only one PGW is selected, via the MME and SGW in the signal path. The selected PGW then assigns the UE an IP. The UE's IP does not subsequently change, such that handover to another PGW or MME after that is not possible without losing the IP, and terminating any active packet flows.

More specifically, currently, a UE attach causes the following steps to occur: 1. NAS authentication for the UE; 2. obtaining the IP for the UE from the PGW; 3. obtaining profiles for the UE at the PGW from the PCRF and/or AAA; and 4. setting up one tunnel (e.g., a GTP tunnel) per bearer to the UE via the PGW for each service defined in the profiles. Thus, the current architecture will have tunnels, e.g., SGW-PGW S5, S2a, S2b tunnels, set up by the completion of the attach. These tunnels will require handover and/or reestablishment if the connection is handed over to another PGW.

Moving on to describe the problem, as described herein, it may be useful to permit more than a small number of PGWs to be used, or to have PGWs that cover a smaller area. In urban environments, greater density creates a need for more PGWs to meet the service needs of users. With the advent of 4G and 5G, greater densification is anticipated, so this problem will be more widespread. As more PGWs are used, the border region between PGWs becomes an area where handover coordination becomes helpful. As well, as more PGWs are used, it becomes helpful to be able to facilitate operation and interoperation with a plurality of PGWs and PGWs from a variety of manufacturers with a variety of capabilities.

Conventional handovers require an anchor point, to ensure that services are not dropped but are instead redirected to the new service location. The PGW handover may also require an anchor point. However, such an anchor point does not exist in the standards as they exist today. Moreover, anchoring services at one PGW requires setup procedures that can take a substantial amount of time, similar to the time required to perform an initial attach of a UE, which delay makes handovers more difficult.

Solving this problem, in one embodiment, to facilitate handover between two PGWs, an intermediary core network node, such as an MME, when performing an attach of a user equipment, may connect to two or more PGWs simultaneously upon receiving the attach request. More than one PGW may thus be enabled to connect to the UE at the same time. Data flow may be controlled by the intermediary node, and the intermediary node may serve as the switching point or anchor, redirecting flows to the other PGW upon attach. The intermediary node may, in order to perform this function, act as a PCRF proxy and/or AAA proxy for all PGWs and UEs, or may provide these functions as internal modules. The intermediary node may also provide proxying of network access stratum protocols, such as S1 and S2, thus acting as a radio access network proxy and coordinating node. The intermediary node may use ePDG or TWAG (or S5 from SGW) to facilitate multi-access network virtualization and access to the one or more PGWs. The intermediary node may use TTG as well as ePDG, in order to anchor UEs on a PGW and also at the same time on a 3G packet core.

Currently, the PGW may obtain the IP address of a UE from one of three sources: internal DHCP; external DHCP; and an AAA server. In some embodiments, the intermediary node may support one or all of these ways of obtaining IP addresses. In some embodiments, the intermediary node may provide transparent IP address translation for the UE, or proxying, or may provide its own IP address in the manner of a NAT server. In the case that more than one of the PGWs in the system use the same AAA server, the AAA server may provide a single IP address, which could be used by the intermediary node transparently over handover for the UE across multiple PGWs. In the case that different IPs are assigned by different PGWs, proxying, tunneling, and address translation may be used.

In some embodiments, on UE attach at second PGW, the PCRF may receive a second request for policies from the second PGW and may refuse to respond to the request because it is a request for the same IMSI. In some embodiments, a PCRF is modified to support responding to multiple requests for the same IMSI with multiple responses.

In some embodiments, the intermediary node may provide temporary traffic forwarding during PGW handover, until the target PGW is ready to receive traffic, at which time the tunnel may be taken down. In some embodiments, the target PGW is enabled to set up the UE tunnels, etc. on demand.

In some embodiments, public safety organizations may choose to retain sovereignty over their own PGWs, but may provide their own PGWs with connectivity to towers and core network elements owned and operated by a third party mobile operator. In such cases, the embodiments described herein would enable handover from a public safety network's PGW to a macro operator's PGW and vice versa.

In some embodiments, traffic filtering and inspection may be supported. For example, tunnels with certain characteristics, tunnels where sensitive material has been detected, tunnels that have been identified as network intrusions, etc. may be shut down at the intermediary node. An enterprise network may, in some embodiments, provide its own PGW and/or intermediary node and may facilitate handover to and from a macro network while retaining control over traffic filtering and inspection.

In some embodiments, gradual migration from one PGW to another PGW, including cross-vendor migration, with no downtime, may be supported by enabling inter-PGW handover via an intermediary node.

In a second embodiment, to facilitate PGW-PGW handover, a direct PGW-PGW tunnel on handover may be created. In some embodiments, a tunnel may be created and used between intermediary nodes to facilitate handover.

FIG. 1 is a schematic diagram of a system for providing wireless access across multiple PGWs, in accordance with some embodiments. Mobile devices 101, which may be user equipments (UEs), are connected to base station 102, which may be an LTE eNodeB, a 3G nodeB, or both. Mobile devices 105, which may be Wi-Fi UEs, laptops, or other devices connecting via Wi-Fi, are connected to Wi-Fi gateway 106. Multi-radio access technology (multi-RAT) node 104 is capable of providing LTE, 3G, trusted wireless access gateway (TWAG), and/or evolved packet data gateway (ePDG) functionality. Mobile devices 103 may be any mobile device capable of connecting to any of the radio access technologies supported by multi-RAT node 104. Wi-Fi gateway 106 may be a TWAG and/or ePDG as well. In some embodiments, the nodeB/eNodeB 102 communicates with coordinating node 107a via an Iuh protocol (for 3G) or an S1 protocol (for LTE). The Wi-Fi gateway communicates with coordinating node 107a via an S2a and/or S2b protocol. The multi-RAT node uses one or more of Iuh, S1, S2a/S2b. Collectively, nodes 102, 104, 106 constitute a radio access network (RAN) portion of the network.

Coordinating node 107a acts as a gateway for the RAN portion of the network. Connections for the core network are proxied through coordinating node 107a, including connections with a mobility management entity (MME) and a serving gateway (SGW), both of which are omitted for simplicity. As coordinating node 107a proxies the functions of the MME and SGW, it can be understood to provide those functions for all RAN users 101, 103, 105 communicating with it, as well as upstream toward the rest of the core network.

Two PGWs are shown, PGW 108 and PGW 109, each providing connectivity to different packet data networks. Coordinating node 107a is in communication with both of these PGWs; this may be possible if, for example, coordinating node 107a sits on the public Internet with connectivity to both PGW 108 and PGW 109 via a G1 protocol. As shown, coordinating node 107a performs its proxying functions for proxying Iuh, S1, S2a and S2b connections to both PGW 108 and PGW 109, which are correspondingly configured to treat coordinating node 107a as an MME or SGW, etc., as needed by, for example, assigning the hostname or IP address of the coordinating node at the PGWs.

PGW 108 and PGW 109 are also configured to communicate with a policy charging and rules function (PCRF) server. However, instead of being configured with the direct IP address of the PCRF server, PGW 108 and PGW 109 are configured with an IP address of the coordinating node as the PCRF server. The coordinating node thus plays a dual role, and is shown in this PCRF proxy role with dashed outline 107b. Coordinating node 107b can be the same as coordinating node 107a, in some embodiments, or a different node or gateway, or a duplicate node or gateway, in other embodiments.

Coordinating node 107b performs a PCRF proxy function for communications between PGW 108 and PCRF 110, and between PGW 109 and PCRF 110, as shown using the Gx protocol, in some embodiments. Multiple PCRFs could be configured, instead of the single PCRF shown, in some embodiments. Alternately, coordinating node 107b may perform as a proxy for authentication, authorization and accounting (AAA) server 111, in some embodiments. Coordinating node 107b may perform AAA proxying using the Diameter protocol. Coordinating node 107b may perform both AAA and PCRF proxying. The AAA and PCRF servers may be on the same or different networks as the PGWs, but are typically on a trusted network, e.g., the core network.

In operation, when an attach message is received from any mobile device 101, 103, 105, the attach request is sent to coordinating node 107a. Coordinating node 107a can decide whether to set up connections to one, two, or more than two PGWs. Coordinating node 107a then sets up two or more connections at attach time to PGW 108 and PGW 109. Each PGW requires that policies for the UE be downloaded before the PGW performs its standard functions of setting up bearers and assigning IP addresses; these policies may be downloaded using coordinating node 107b as PCRF or AAA proxy.

PGW 108 and PGW 109 will receive authorization for the requesting UE and will then set up one or more bearers for the UE, which includes assigning an IP address for the UE. Coordinating node 107a will receive these IP addresses and will configure an IP address translation function with these IP addresses. This will enable the UE to make use of one bearer or the other bearer as needed, based on what IP address the translation function assigns to UE traffic as it passes through the gateway toward either PGW 108 or PGW 109.

This architecture enables a UE to simultaneously access both PGW 108 and 109, and their respective networks. Since the RAN data connection from the UE is encrypted but the encrypted tunnel terminates at the coordinating node 107a, coordinating node 107a is free to forward packets to either PGW. In the simplest cases, handover between the two PGWs may be as simple as routing packets to one or the other of the two PGWs, together with sending handover signaling messages from coordinating node 107a to the RAN to execute the handover. In some embodiments, data for an in-progress handover may be passed from one PGW's bearer to the other PGW's bearer until handover traffic begins to arrive at the target network.

In some embodiments, connections to additional PGWs may be set up subsequent to attach but before handover. For example, a coordinating node may be able to determine, using the currently-attached eNodeB or a GPS coordinate of an eNodeB or the UE itself, that a UE is moving toward a border between two regions supported by different PGWs. The coordinating node may then set up a bearer with a second PGW in order to prepare for handover to the second PGW prior to a handover request being received.

In some cases, a PCRF or AAA server may be able to service multiple near-simultaneous requests for a single IMSI, including from different IP addresses. In other cases, the coordinating node can be configured to effectively proxy the connection to the PCRF or AAA server to provide an adequate response to the second-requesting PGW. For example, coordinating node 107b may cache a first response to a PCRF query for a particular IMSI and may provide a response based on the first response to a second requester.

Additionally, a single core network is shown by the figure, but the components could be split among multiple core networks, in some embodiments. For example, connectivity as described herein could be provided across two PGWs residing in different networks, in some embodiments.

Figure 2:
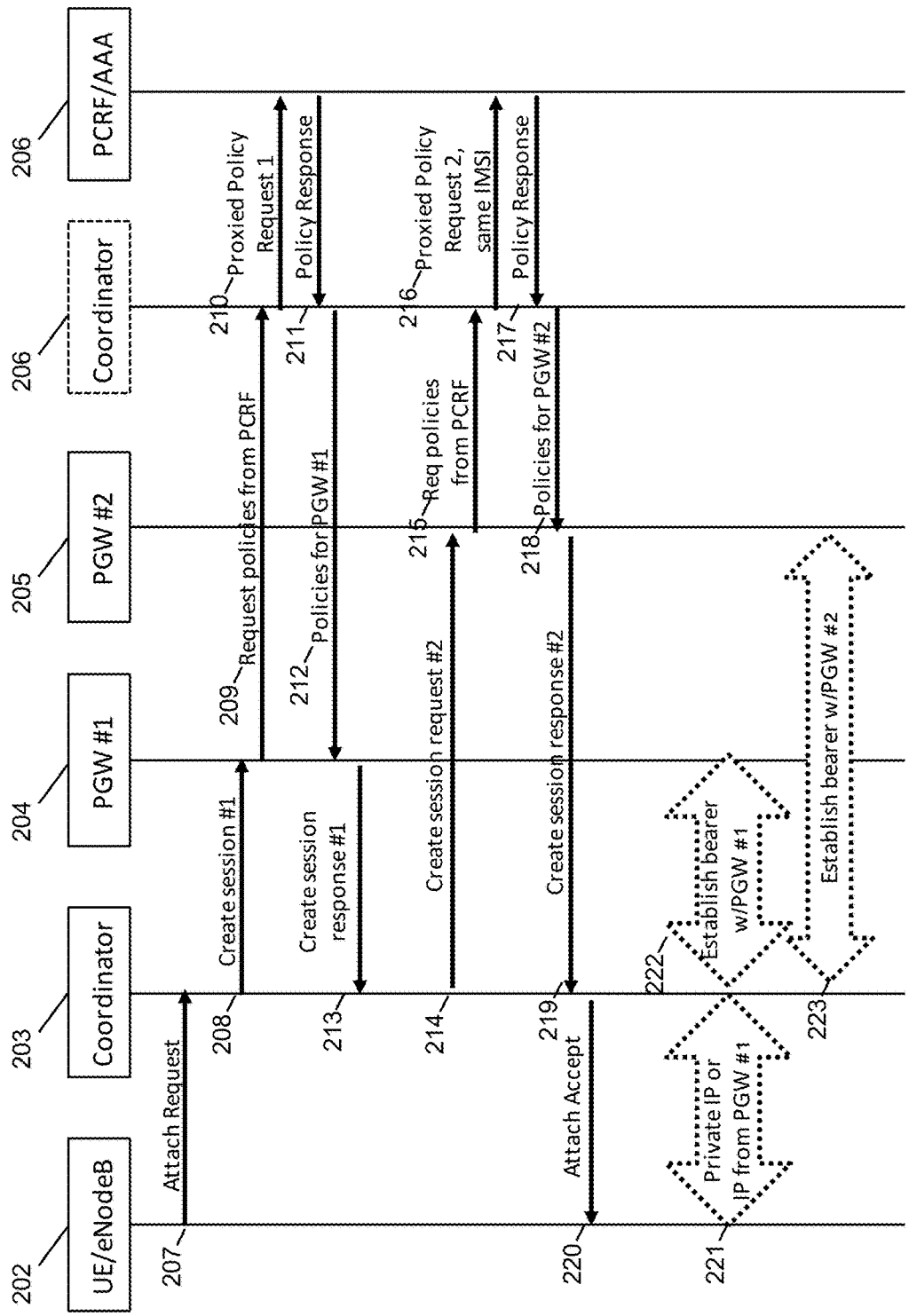
FIG. 2 is a call flow diagram of a UE attaching to an access network, in accordance with some embodiments.

FIG. 2 is a call flow diagram of a UE attaching to an access network, in accordance with some embodiments. UE and eNodeB 202 are shown as a single entity for simplification purposes, but are understood to constitute standard UE and eNodeB behavior. Coordinator 203 and coordinator 206 may be the same device, in some embodiments, acting as a gateway between UE/eNodeB 202 and PGW-1 and PGW-2 204 and 205, and also acting as a gateway between PGW-1 and PGW-2 204, 205 and PCRF/AAA 206. PCRF/AAA 206 is understood to provide functions as appropriate in the particular packet data network being described. Coordinator 203 may be acting as an MME, in some embodiments.

In operation, an attach request from the UE 207 traverses the eNodeB to coordinator 203. Coordinator 203 may then send create session request #1 208 to PGW-1 204. PGW-1 204 may then request (209) appropriate policies for the UE from the PCRF, but this request is proxied by coordinator 208 and resent as proxied policy request 1 (210). PCRF 206 responds with policy response 211, which is handled by the proxy at coordinator 206 and sent to PGW-1 204 at step 212. PGW-1 then creates a session and informs the coordinator 203 at step 213. The PCRF policy request may include the IMSI of the UE.

At the same time, or prior to setting up the session at the eNodeB, or both, coordinator 203 may send create session request #2 214 to PGW-2 205, which may then request (215) appropriate policies for the UE from the PCRF, which request is proxied by coordinator 208 and resent as proxied policy request 2 (216). PCRF 206 responds with policy response 217, which is handled by the proxy at coordinator 206 and sent to PGW-2 205 at step 218. PGW-2 then creates a session and informs the coordinator 203 at step 219. Now two sessions exist at coordinator 203. The second PCRF policy request also includes the same IMSI.

Coordinator 203 then sends an attach accept message 220 to eNodeB 202. Only one of the sessions is sent to eNodeB 202. However, two bearers (222 and 223) are established, one with PGW-1 and another with PGW-2. The IP address assigned to the UE (221) is one of: an address assigned from a private IP pool at coordinator 203; an IP address assigned by PGW-1 204; or an IP address assigned by PGW-2 205. In the event that either the IP assigned by PGW-1 or PGW-2 is used, it is understood that coordinator 203 will use network address translation (NAT) to enable the UE to use that same IP regardless of whether the UE is handed over to the other PGW.

Figure 3:
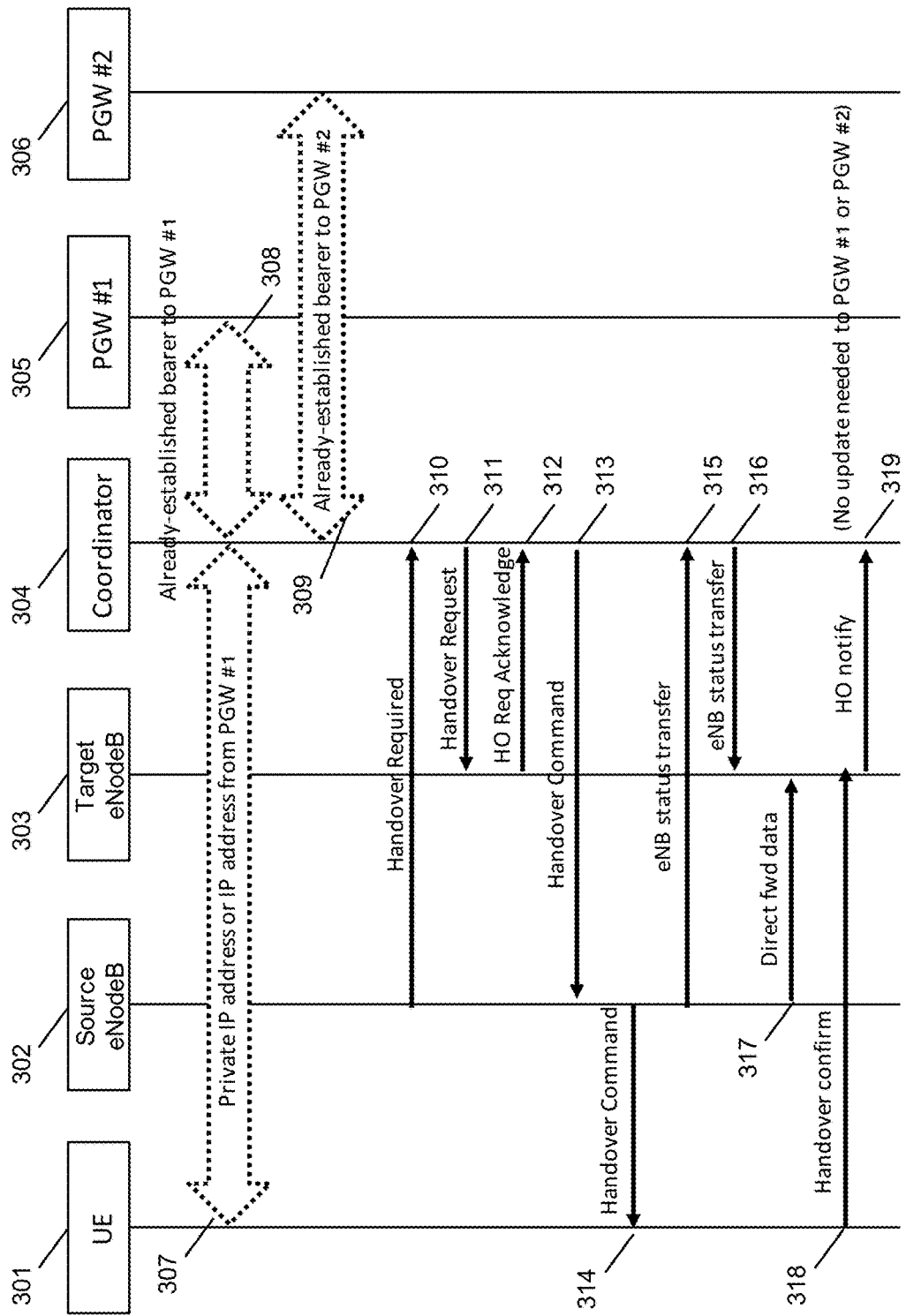
FIG. 3 is a call flow diagram of a UE handover between two eNodeBs, in accordance with some embodiments.

FIG. 3 is a call flow diagram of a UE handover between two eNodeBs, in accordance with some embodiments. The call flow is a continuation of the call flow in FIG. 2. UE 301 is in communication with a source eNodeB 302 and a target eNodeB 303, and is requesting a handover from the source to the target. Coordinator 304 is configured as a gateway between both source and target 302, 303 and core network resources, including PGW-1 305 and PGW-2 306. Source eNodeB 302 is in communication with PGW-1 305. Target eNodeB 303 is in communication with PGW-2 306. In some embodiments, coordinating node 304 may be part of an MME, or may be co-located with an MME, or may be performing proxy functions of an MME.

At step 307, a tunnel is in place between UE 301 and coordinator 304, using either a private IP address, or the IP address from PGW-1 305, or from PGW-2 306. Also already established are two bearers 308, 309 to PGW-1 305 and 306, as already described in FIG. 2.

At step 310, a handover is requested by source eNodeB 302. At step 311, coordinator 304 requests the handover of target eNodeB 303. At step 312, the handover request is acknowledged by the target eNodeB 303. At step 313, the handover is commanded from coordinator 304, taking the role of the MME. At step 314, the handover acknowledgement of UE 301 occurs, with UE 301 then attaching to target eNodeB 303. At steps 315 and 316, in some embodiments, eNodeB status transfer may be performed between source eNodeB 302 and target eNodeB 303, in some cases through coordinator 304 as proxy or as gateway. In some embodiments (not shown), coordinator 304 may directly route packets addressed to UE 301 and received from PGW-1 305 to the UE.

At step 317, in some embodiments, direct forwarding of data may be performed from source eNodeB 302 to target eNodeB 303. At step 318, UE 301 confirms the handover to target eNodeB 303, which notifies coordinator 304. However, coordinator 303 need not provide any update to either PGW-1 305 or PGW-2 306, as the connections to both PGWs do not need to be torn down. A tracking area update may be performed if needed and a connection may be torn down, in some embodiments.

Handovers of 3G and/or circuit-switched calls is performed by the coordinating node acting as a home nodeB gateway (HNBGW), in some embodiments. The coordinating node forwards IP packets using the regular IPsec tunnels already established by the HNBGW using one or the other of the active PGW bearers, so no special signaling is required for such calls to continue during and after handover. Similarly, handovers of Internet Multimedia Subsystem (IMS) or Voice over LTE (VoLTE) calls may be performed in the same way, using one or the other of the existing PGW connections to provide continuous IP connectivity to the IMS core and thus call continuity as well.

Figure 4:
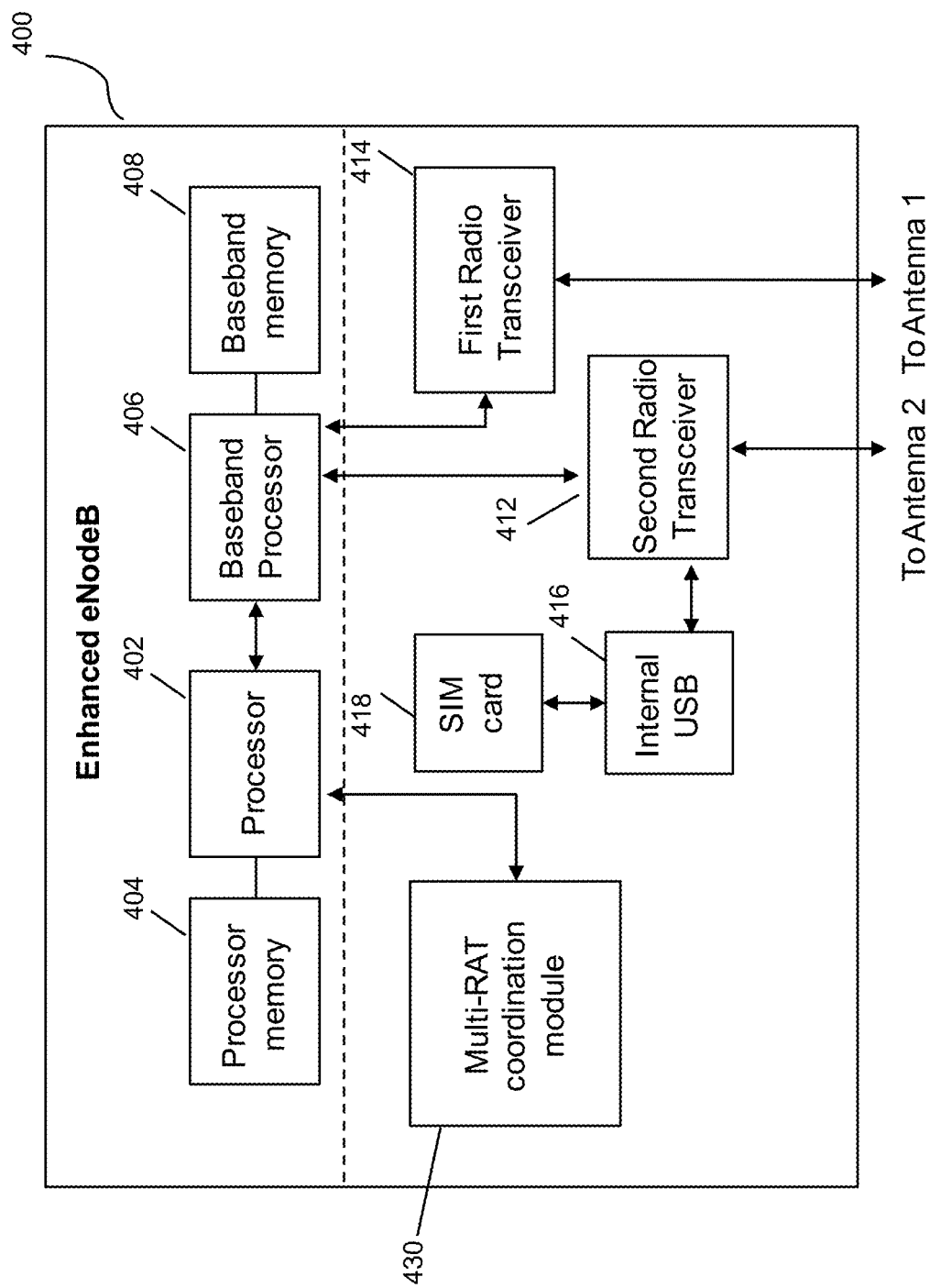
FIG. 4 is a schematic diagram of an enhanced eNodeB, in accordance with some embodiments.

FIG. 4 is a schematic diagram of an enhanced base station, in accordance with some embodiments. Enhanced base station 400 may be an eNodeB for use with LTE, and may include processor 402, processor memory 404 in communication with the processor, baseband processor 406, and baseband processor memory 408 in communication with the baseband processor. Enhanced eNodeB 400 may also include first radio transceiver 414 and second radio transceiver 412, internal universal serial bus (USB) port 416, and subscriber information module card (SIM card) 418 coupled to USB port 416. In some embodiments, the second radio transceiver 412 itself may be coupled to USB port 416, and communications from the baseband processor may be passed through USB port 416. Although an enhanced multi-RAT base station is shown, the methods used herein can be used with a standard eNodeB, in some embodiments.

Processor 402 and baseband processor 406 are in communication with one another. Processor 402 may perform routing functions, and may determine if/when a switch in network configuration is needed, such as when a prior network interface or network route to a core network becomes disabled and a new mesh network interface should be configured as a default route. Baseband processor 406 may generate and receive radio signals for both radio transceivers 414 and 412, based on instructions from processor 402. In some embodiments, processors 402 and 406 may be on the same physical logic board. In other embodiments, they may be on separate logic boards. In some embodiments, a wired network interface may also be provided, shown as Ethernet module 440. The wired interface may be used for connection to a co-located base station, in some embodiments, or the co-located base station may be provided as part of base station 400. The wired interface may be used for connection to a core network via a fiber optic or Ethernet WAN connection, in some embodiments.

The first radio transceiver 414 may be a radio transceiver capable of providing LTE eNodeB functionality, and may be capable of higher power and multi-channel OFDMA. The second radio transceiver 412 may be a radio transceiver capable of providing LTE UE functionality. Both transceivers 414 and 412 are capable of receiving and transmitting on one or more LTE bands. In some embodiments, either or both of transceivers 414 and 412 may be capable of providing both LTE eNodeB and LTE UE functionality. Transceiver 414 may be coupled to processor 402 via a Peripheral Component Interconnect-Express (PCI-E) bus, and/or via a daughtercard. As transceiver 412 is for providing LTE UE functionality, in effect acting as a UE modem, it may be connected via the same or different PCI-E bus, or by a USB bus, and may also be coupled to SIM card 418.

SIM card 418 may provide information required for authenticating the UE modem to the evolved packet core (EPC), such as the IMSI used to authenticate to the PCRF server. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul, or both, may be used either as primary or secondary. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 414 and 412, which may be Wi-Fi 402.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration. The wireless interface may be used to create a mesh network with other base stations, including for the purpose of providing a wireless backhaul connection as described herein.

A multi-RAT coordination module 430 may also be included, for coordinating one or more radio access technologies, such as 2G, 3G, Wi-Fi, and/or LTE. Additional radio transceivers may be provided as well. Multi-RAT coordination module 430 may be configured to use one or more IP addresses assigned to one RAT for providing services to UEs on another RAT. Multi-RAT coordination module 430 may be configured to enable multiple connections to PGWs by, for example, performing network address translation (NAT) functions, as elsewhere described herein as part of the coordinating node.

Processor 402 may identify the appropriate network configuration, and may perform routing of packets from one network interface to another accordingly. Processor 402 may use memory 404, in particular to store a routing table and/or routing rules to be used for routing packets. Baseband processor 406 may perform operations to generate the radio frequency signals for transmission or retransmission by both transceivers 414 and 412. Baseband processor 406 may also perform operations to decode signals received by transceivers 414 and 412. Baseband processor 406 may use memory 408 to perform these tasks.

Figure 5:
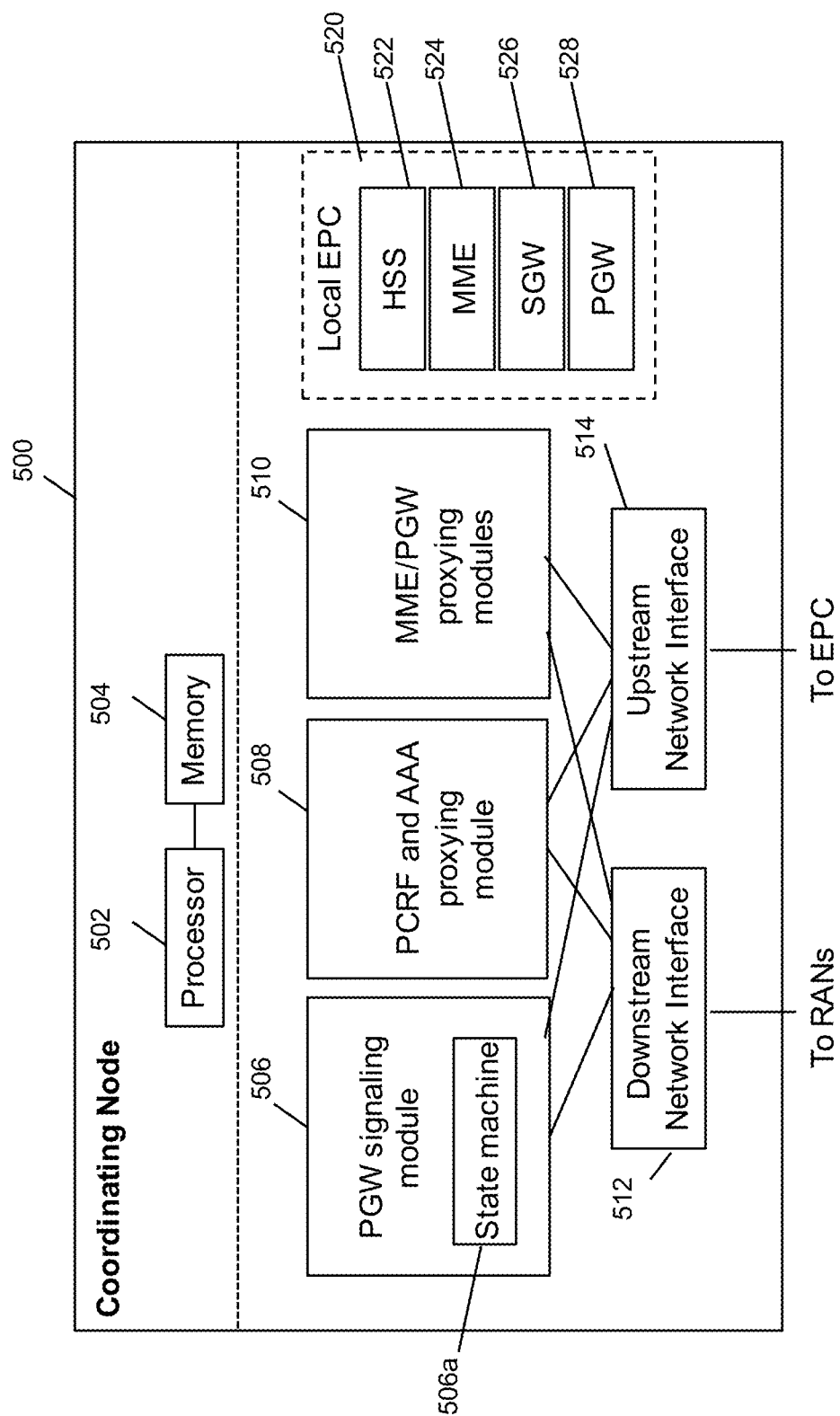
FIG. 5 is a schematic diagram of a coordinating node, in accordance with some embodiments.

FIG. 5 is a schematic diagram of a coordinating node, in accordance with some embodiments. Coordinating node 500 includes processor 502 and memory 504, which are configured to provide the functions described herein and as described with reference to FIGS. 1-3. Also present are PGW signaling module 506 (for proxying and handling states of one, two, or more PGWs), PCRF and AAA proxying module 508, and MME/PGW proxying modules 510. Each module may contain a state machine for performing signaling proxying and for determining what information should be saved, mapped from other information, or other information. PGW state machine 506a is shown. One state machine may be provided per tracked node, e.g., two state machines for tracking two PGWs. These may be able to be instantiated as needed, in some embodiments.

In some embodiments, a downstream network interface 512 is provided for interfacing with the RANs, which may be a radio interface (e.g., LTE), and an upstream network interface 514 is provided for interfacing with the core network, including PCRF, etc., which may be either a radio interface (e.g., LTE) or a wired interface (e.g., Ethernet). The upstream network interface may allow data to be received from an eNodeB, from a RAN node, from a PGW, from a PCRF, or from another node as needed.

Signaling coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In some embodiments, the radio transceivers described herein may be base stations compatible with a Long Term Evolution (LTE) radio transmission protocol or air interface.

The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 5G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

Although the scenarios for interference mitigation are described in relation to macro cells and micro cells, or for a pair of small cells or pair of macro cells, the same techniques may be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods for providing interference mitigation are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing Internet Protocol (IP) access across 5G core network gateways, comprising:
   receiving, from a user equipment (UE), at a coordinating node, an attach request;
   sending a first request to create a first new session to a first 5G core network gateway (GW) in response to the attach request from the UE, and a second request to create a second new session to a second GW, also in response to the attach request from the UE;

receiving, from the first GW and at the coordinating node, a first request for policies for the UE;

receiving, from the second GW and at the coordinating node, a second request for policies for the UE;

proxying the first and the second requests for policies to a policy server;

opening a first data tunnel between the coordinating node and the first GW with a first IP address at the coordinating node, the first IP address provided by the first GW;

opening a second data tunnel between the coordinating node and the second GW with a second IP address while maintaining the first data tunnel at the coordinating node, the second IP address provided by the second GW; and opening a data tunnel between the UE and the coordinating node for providing IP access for the UE to both the first GW and the second GW.

2. The method of claim 1, further comprising anchoring IP mobility of the UE at the coordinating node across multiple GWs.

3. The method of claim 1, further comprising allocating an IP address to the UE from an address pool at the coordinating node.

4. The method of claim 1, further comprising performing network address translation at the coordinating node for the UE from the second IP address to the first IP address in connection with data sent to and from the UE.

5. The method of claim 1, further comprising: receiving, from the UE, a handover request to be handed over from a source base station to a target base station, the source base station in communication with the first GW, the target base station in communication with the second GW; sending, to the UE, a handover command; and using the existing second data tunnel to transport data from the UE to the second GW.

6. The method of claim 1, further comprising using a prior IP address between the UE and the coordinating node upon handover from a source base station to a target base station, wherein the source base station and the target base station are associated with different GWs and the prior IP address is associated with a target GW of the target base station.

7. The method of claim 1, further comprising enabling handover of one of a 5G, Voice over LTE (VoLTE) or 3G voice call across from the first GW to the second GW.

8. The method of claim 1, further comprising terminating the data tunnel between the UE and the coordinating node at the coordinating node; and forwarding data from the data tunnel between the UE and the coordinating node to one of the first and the second data tunnel.

9. The method of claim 1, further comprising forwarding data from the first data tunnel to the second data tunnel to facilitate handover of the UE from the first GW to the second GW.

10. The method of claim 1, further comprising proxying, at the coordinating node, a mobility management entity (MME).

11. The method of claim 1, further comprising proxying, at the coordinating node, a Diameter server to enable a single profile to be used to preserve a single IP address for the UE across multiple GWs.

12. A system for providing Internet Protocol (IP) access across 5G packet data network gateways, comprising:

a coordinating node situated between and acting as a gateway between gNodeB base station and a first and a second 5G core network gateway (GW), the coordinating node further comprising a memory containing instructions that, when executed, cause the coordinating node to:

receive an attach request from a UE;

send a first request to create a first new session to the first GW and a second request to create a second new session to the second GW, in response to the attach request from the UE;

open a first data tunnel between the coordinating node and the first GW with a first IP address assigned by the first GW;

open a second data tunnel between the coordinating node and the second GW with a second IP address assigned by the second GW while maintaining the first data tunnel; and open a data tunnel between the UE and the coordinating node using a third IP address for providing IP access for the UE to both the first GW and the second GW.

13. The system of claim 12, further comprising a PCRF server configured to provide policy responses to multiple policy requests for policies for a particular user equipment (UE) identifier.

14. The system of claim 13, wherein the UE identifier is an International Mobile Subscriber Identity (IMSI).

15. The system of claim 12, further comprising a 5G radio access technology (RAT) base station providing Iuh, S1, S2a and S2b protocol interfaces to the coordinating node.

16. The system of claim 12, wherein the memory contains additional instructions that, when executed, cause the coordinating node to:

receive, from the first GW, a first request for policies for the UE;

receive, from the second GW, a second request for policies for the UE; and proxy the first and the second requests for policies to the PCRF server.

17. The system of claim 12, wherein the memory contains additional instructions that, when executed, cause the coordinating node to:

proxy messages between the first GW and a user equipment (UE), and between the second GW and the UE;

translate UE IP addresses in messages from the UE to the first and the second GW, from the assigned particular IP to either: the address assignment from the first GW, in messages to the first GW, or the address assignment from the second GW, in messages to the second GW, thereby enabling the UE to use both the address assignment from the first GW and the address assignment from the second GW; and proxy requests between the first GW and the policy control and rules function (PCRF) server, and between the second GW and the PCRF server.

* * * * *